(12) United States Patent
Cory

(10) Patent No.: US 7,088,767 B1
(45) Date of Patent: Aug. 8, 2006

(54) METHOD AND APPARATUS FOR OPERATING A TRANSCEIVER IN DIFFERENT DATA RATES

(75) Inventor: Warren E. Cory, Redwood City, CA (US)

(73) Assignee: Xilinx, Inc., San Jose, CA (US)

( * ) Notice: Subject to any disclaimer, the term of this patent is extended or adjusted under 35 U.S.C. 154(b) by 886 days.

(21) Appl. No.: 10/090,251

(22) Filed: Mar. 1, 2002

(51) Int. Cl.
H04B 1/38 (2006.01)
G06F 13/38 (2006.01)

(52) U.S. Cl. .................. 375/219; 710/71; 341/100
(58) Field of Classification Search ........... 375/219, 375/371, 220, 224, 225; 341/100, 101; 455/427; 710/71
See application file for complete search history.

(56) References Cited

U.S. PATENT DOCUMENTS

| | | | |
|---|---|---|---|
| 4,758,985 A | 7/1988 | Carter | |
| 4,855,669 A | 8/1989 | Mahoney | |
| 5,072,418 A | 12/1991 | Boutaud et al. | |
| 5,142,625 A | 8/1992 | Nakai | |
| RE34,363 E | 8/1993 | Freeman | |
| 5,274,570 A | 12/1993 | Izumi et al. | |
| 5,311,114 A | 5/1994 | Sambamurthy et al. | |
| 5,339,262 A | 8/1994 | Rostoker et al. | |
| 5,347,181 A | 9/1994 | Ashby et al. | |
| 5,349,612 A * | 9/1994 | Guo et al. .............. | 375/371 |
| 5,361,373 A | 11/1994 | Gilson | |
| 5,400,370 A * | 3/1995 | Guo ....................... | 375/371 |
| 5,457,410 A | 10/1995 | Ting | |
| 5,473,267 A | 12/1995 | Stansfield | |
| 5,500,943 A | 3/1996 | Ho et al. | |
| 5,504,738 A | 4/1996 | Sambamurthy et al. | |
| 5,537,601 A | 7/1996 | Kimura et al. | |
| 5,543,640 A | 8/1996 | Sutherland et al. | |
| 5,550,782 A | 8/1996 | Cliff et al. | |
| 5,552,722 A | 9/1996 | Kean | |

(Continued)

FOREIGN PATENT DOCUMENTS

EP 0315275 A2 10/1989

(Continued)

OTHER PUBLICATIONS

Sayfe Kiaei et al., "VLSI Design of Dynamically Reconfigurable Array Processor-Drap," IEEE, Feb. 1989, pp. 2484-2488, V3.6, IEEE, 3 Park Avenue, 17th Floor, New York, NY 10016-5997.

(Continued)

Primary Examiner—Dac Ha
Assistant Examiner—Jaison Joseph
(74) Attorney, Agent, or Firm—H. C. Chan

(57) ABSTRACT

A transceiver can be used to send and receive data at a lower data rate than the data rate its SERDES is designed to operate. It contains a transmitter interface that receives a first set of data at a lower data rate and delivers a second set of data to the SERDES at a higher data rate. The transceiver also contains a receiver interface that receives a third set of data from the SERDES at the higher data rate and delivers a fourth set of data at the lower data rate. To reduce the minimum transmission serial data rate, one embodiment of the present invention derives a half-speed clock for the transmitter interface. Using the half-speed clock, the transmitter interface supplies data to be transmitted at half the normal rate with respect to a reference clock. As a result, the data rate is reduced. The opposite operation is used for the receiver interface.

11 Claims, 6 Drawing Sheets

U.S. PATENT DOCUMENTS

| | | | |
|---|---|---|---|
| 5,574,930 A | 11/1996 | Halverson, Jr. et al. | |
| 5,574,942 A | 11/1996 | Colwell et al. | |
| 5,581,745 A | 12/1996 | Muraoka | |
| 5,600,845 A | 2/1997 | Gilson | |
| 5,652,904 A | 7/1997 | Trimberger | |
| 5,671,355 A | 9/1997 | Collins | |
| 5,705,938 A | 1/1998 | Kean | |
| 5,732,250 A | 3/1998 | Bates et al. | |
| 5,737,631 A | 4/1998 | Trimberger | |
| 5,740,404 A | 4/1998 | Baji | |
| 5,742,179 A | 4/1998 | Sasaki | |
| 5,742,180 A | 4/1998 | DeHon et al. | |
| 5,748,979 A | 5/1998 | Trimberger | |
| 5,752,035 A | 5/1998 | Trimberger | |
| 5,760,607 A | 6/1998 | Leeds et al. | |
| 5,809,517 A | 9/1998 | Shimura | |
| 5,835,405 A | 11/1998 | Tsui et al. | |
| 5,874,834 A | 2/1999 | New | |
| 5,889,788 A | 3/1999 | Pressly et al. | |
| 5,892,961 A | 4/1999 | Trimberger | |
| 5,914,616 A | 6/1999 | Winegarden et al. | |
| 5,914,902 A | 6/1999 | Lawrence et al. | |
| 5,933,023 A | 8/1999 | Young | |
| 5,970,254 A | 10/1999 | Cooke et al. | |
| 6,011,407 A | 1/2000 | New | |
| 6,020,755 A | 2/2000 | Andrews et al. | |
| 6,026,481 A | 2/2000 | New et al. | |
| 6,031,473 A * | 2/2000 | Kubinec | 341/100 |
| 6,081,709 A * | 6/2000 | Karabinis | 455/427 |
| 6,096,091 A | 8/2000 | Hartmann | |
| 6,154,051 A | 11/2000 | Nguyen et al. | |
| 6,163,166 A | 12/2000 | Bielby et al. | |
| 6,172,990 B1 | 1/2001 | Deb et al. | |
| 6,178,541 B1 | 1/2001 | Joly et al. | |
| 6,181,163 B1 | 1/2001 | Agrawal et al. | |
| 6,211,697 B1 | 4/2001 | Lien et al. | |
| 6,242,945 B1 | 6/2001 | New | |
| 6,272,451 B1 | 8/2001 | Mason et al. | |
| 6,279,045 B1 | 8/2001 | Muthujumaraswathy et al. | |
| 6,282,627 B1 | 8/2001 | Wong et al. | |
| 6,301,696 B1 | 10/2001 | Lien et al. | |
| 6,343,207 B1 | 1/2002 | Hessel et al. | |
| 6,353,331 B1 | 3/2002 | Shimanek | |
| 6,356,987 B1 | 3/2002 | Aulas | |
| 6,389,558 B1 | 5/2002 | Herrmann et al. | |
| 6,434,735 B1 | 8/2002 | Watkins | |
| 6,460,172 B1 | 10/2002 | Insenser Farre et al. | |
| 6,467,009 B1 | 10/2002 | Young et al. | |
| 6,483,342 B1 | 11/2002 | Britton et al. | |
| 6,507,942 B1 | 1/2003 | Calderone et al. | |
| 6,510,548 B1 | 1/2003 | Squires | |
| 6,518,787 B1 | 2/2003 | Allegrucci et al. | |
| 6,519,753 B1 | 2/2003 | Ang | |
| 6,522,167 B1 | 2/2003 | Ansari et al. | |
| 6,532,572 B1 | 3/2003 | Tetelbaum | |
| 6,539,508 B1 | 3/2003 | Patrie et al. | |
| 6,541,991 B1 | 4/2003 | Horncheck et al. | |
| 6,578,174 B1 | 6/2003 | Zizzo | |
| 6,587,995 B1 | 7/2003 | Duboc et al. | |
| 6,588,006 B1 | 7/2003 | Watkins | |
| 6,601,227 B1 | 7/2003 | Trimberger | |
| 6,604,228 B1 | 8/2003 | Patel et al. | |
| 6,611,951 B1 | 8/2003 | Tetelbaum et al. | |
| 2001/0049813 A1 | 12/2001 | Chan et al. | |
| 2003/0062922 A1 | 4/2003 | Douglass et al. | |

FOREIGN PATENT DOCUMENTS

| | | |
|---|---|---|
| EP | 0 905 906 A2 | 3/1999 |
| EP | 1 235 351 A1 | 8/2002 |
| WO | WO 93 25968 A1 | 12/1993 |

OTHER PUBLICATIONS

Vason P. Srini, "Field Programmable Gate Array (FPGA) Implementation of Digital Systems: an Alternative to ASIC," IEEE, May 1991, pp. 309-314, IEEE, 3 Park Avenue, 17th Floor, New York, NY 10016-5997.

G. Maki et al., "A Reconfigurable Data path Processor," IEEE, Aug. 1991, pp. 18-4.1 to 18-4.4, IEEE, 3 Park Avenue, 17th Floor, New York, NY 10016-5997.

Jacob Davidson, "FPGC Implementation of Reconfigurable Microprocessor," IEEE, Mar. 1993, pp. 3.2.1-3.2.4, IEEE, 3 Park Avenue, 17th Floor, New York, NY 10016-5997.

Christian Iseli et al., "Beyond Superscaler Using FPGA's," IEEE, Apr. 1993, pp. 486-490, IEEE, 3 Park Avenue, 17th Floor, New York, NY 10016-5997.

P.C. French et al., "A Self-Reconfiguring Processor,"; IEEE, Jul. 1993, pp. 50-59, IEEE, 3 Park Avenue, 17th Floor, New York, NY 10016-5997.

Christian Iseli et al., "Spyder: A Reconfigurable VLIW Processor Using FPGA's," IEEE, Jul. 1993, pp. 17-24, IEEE, 3 Park Avenue, 17th Floor, New York, NY 10016-5997.

Michael J. Wirthlin et al., "The Nano Processor: A Low Resource Reconfigurable Processor," IEEE, Feb. 1994, pp. 23-30, IEEE, 3 Park Avenue, 17th Floor,New York, NY 10016-5997.

William S. Carter, "The Future of Programmable Logic and Its Impact on Digital System Design," Apr. 1994, IEEE, pp. 10-16, IEEE, 3 Park Avenue, 17th Floor, New York, NY 10016-5997.

Andre' Dehon, "DPGA-Coupled Microprocessors: Commodity ICs for the Early 21st Century,"IEEE, Feb. 1994, pp. 31-39, IEEE, 3 Park Avenue, 17th Floor, New York, NY 10016-5997.

Osama T., Albaharna, "Area & Time Limitations of FPGA-Based Virtual Hardware," IEEE, Apr. 1994, pp. 184-189, IEEE, 3 Park Avenue, 17th Floor, New York, NY 10016-5997.

U.S. Appl. No. 10/043,769, filed Jan. 9, 2002, Schulz.

Xilinx, Inc., "The Programmable Logic Data Book," 1994, Revised 1995, Xilinx, Inc., 2100 Logic Drive, San Jose, CA. 95124.

Xilinx, Inc., "The Programmable Logic Data Book," 1994, Revised 1995, pp. 2-109 to 2-117, Xilinx, Inc., 2100 Logic Drive, San Jose, CA. 95124.

Xilinx, Inc., "The Programmable Logic Data Book," 1994, Revised 1995, pp. 2-9 to 2-18; 2-187 to 2-199, Xilinx, Inc., 2100 Logic Drive, San Jose, CA. 95124.

Xilinx, Inc., "The Programmable Logic Data Book," 1994, Revised 1995, pp. 2-107 to 2-108, Xilinx, Inc., 2100 Logic Drive, San Jose, CA. 95124.

Christian Iseli et al., "AC++ Compiler for FPGA Custom Execution Units Synthesis," 1995, pp. 173-179, IEEE, 3 Park Avenue, 17th Floor, New York, NY 10016-5997.

International Business Machines, "PowerPC 405 Embedded Processor Core User Manual," 1996, 5th Ed., pp. 1-1 to X-16, International Business Machines, 1580 Rout 52, Bldg. 504, Hopewell Junction, NY 12533-6531.

Yamin Li et al., "Aizup-A Pipelined Processor Design & Implementation on Xilinx FPGA Chip," IEEE, Sep. 1996, pp. 98-106, 98-106, IEEE, 3 Park Avenue, 17th Floor, New York, NY 10016-5997.

Ralph D. Wittig et al., OneChip: An FPGA Processor With Reconfigurable Logic, Apr. 17, 1996, pp. 126-135, IEEE, 3 Park Avenue, 17th Floor, New York, NY 10016-5997.

Xilinx, Inc., "The Programmable Logic Data Book," Jan. 27, 1999, Ch. 3, pp. 3-1 to 3-50, Xilinx, Inc., 2100 Logic Drive, San Jose, CA. 95124.

William B. Andrew et al., "A Field Programmable System Chip Which Combines FPGA & ASIC Circuitry," IEEE, May 16, 1999, pp. 183-186, IEEE, 3 Park Avenue, 17th Floor, New York, NY 10016-5997.

Xilinx, Inc., "The Programmable Logic Data Book," 2000, Ch. 3 pp. 3-1 to 3-117, Xilinx, Inc., 2100 Logic Drive, San Jose, CA. 95124.

U.S. Appl. No. 10/001,871, filed Nov. 19, 2001, Douglass et al.

U.S. Appl. No. 09/991,412, filed Nov. 16, 2001, Herron et al.

U.S. Appl. No. 09/991,410, filed Nov. 16, 2001 Herron et al.

U.S. Appl. No. 09/968,446, filed Sep. 28, 2001, Douglass et al.

Xilinx, Inc., "The Programmable Logic Data Book," 2000, Ch. 3, pp. 3-7 to 3-17; 3-76 to 3-87, Xilinx, Inc., 2100 Logic Drive, San Jose, CA. 95124.

International Business Machines, "Processor Local Bus"Architecture Specifications, 32-Bit Implementation, Apr. 2000, First Edition, V2.9, pp. 1-76,IBM Corporation, Department H83A, P.O. Box 12195, Research Triangle Par, NC 27709.

Xilinx, Inc., Virtex II Platform FPGA Handbook, Dec. 6, 2000, v1.1, pp. 33-75, Xilinx, Inc., 2100 Logic Drive, San Jose, CA. 95124.

U.S. Appl. No. 09/858,732, filed May 15, 2001, Schulz.

U.S. Appl. No. 09/861,112, filed May 18, 2001, Dao et al.

U.S. Appl. No. 09/917,304, filed Jul. 27, 2001, Douglass et al.

Cary D. Snyder and Max Baron; "Xilinx's A-to-Z System Platform"; Cahners Microprocessor; The Insider's Guide to Microprocessor Hardware; Microdesign Resources; Feb. 6, 2001; pp. 1-5.

* cited by examiner

METHOD AND APPARATUS FOR OPERATING A TRANSCEIVER IN DIFFERENT DATA RATES

FIELD OF THE INVENTION

The present invention relates to data communication, and more specifically to a design for changing the speed of operation of a transceiver.

BACKGROUND OF THE INVENTION

As a result of improvement in processing technology, it is now possible to put millions of transistors in an integrated circuit. This increases the amount of processing power of the integrated circuit. However, the processing power may be wasted if there are insufficient input-output (I/O) resources to transfer data to and from the integrated circuit. High speed I/O transceivers alleviate this problem by increasing the data transfer speed of the I/O resources.

A transceiver contains a serializer and a deserializer. A multi-gigabit serializer takes vectors of bits (e.g., 20 bits wide) and converts them to a serial (one bit at a time) bit stream for high-speed transmission over a single differential pair connection. Conversely, a deserializer receives a serial bit stream on a separate differential pair and converts it into vectors of bits. The two circuits together are called a SERDES (serializer/deserializer).

The rate at which bits are transmitted or received on the differential pair connection is called the serial baud rate, commonly measured in Gbps (gigabits per second), or perhaps Mbps (megabits per second). A number of communication standards exist involving the use of SERDES transceivers. The serial baud rates for some common standards of interest range from 1.06 Gbps to 3.125 Gbps. Other potential applications may use lower serial baud rates, e.g., 622 Mbps or lower. It is desirable for a single transceiver to be able to operate over this entire range of serial baud rates, especially when it is embedded in a programmable logic device such as a field-programmable gate array (FPGA), which is intended to be used for a broad range of applications.

It is difficult for conventional circuits like the SERDES to operate at high speed. Thus, many new circuits are specially designed to handle the challenge. Further, the values of components need to be fine-tuned and carefully selected because the SERDES must meet exacting specifications over its entire range of serial baud rates. One result is that a transceiver can optimally operate in a narrow speed range. As an example, some SERDES are designed to operate in the range 800 Mbps to 3.125 Gbps. Such a SERDES is not usable as-is for designs with serial baud rates below 800 Mbps, for example, the 622 Mbps applications noted above. Consequently, it is desirable to be able to extend the range of operation of a SERDES.

SUMMARY OF THE PRESENT INVENTION

The present invention is a transceiver that contains a serializer designed to operate at a first data rate and a transmitter interface that can optionally lower the data rate of the transceiver. The interface receives a first set of data from a data source at a second data rate and delivers a second set of data to the serializer at the first data rate. The transceiver can also include a deserializer designed to operate at the first data rate and a receiver interface. The receiver interface receives a third set of data from the deserializer at the first data rate and delivers a fourth set of data to a data receiver at the second data rate. A control input to the transmitter and receiver interfaces determines whether the first and second data rates are equal, or whether the second data rate is lower than the first.

In one embodiment of the present invention, the transmitter interface derives a half-speed clock from a reference clock and optionally provides it to the data source. Using the half-speed clock, the data source supplies data to be transmitted at half the normal rate with respect to the reference clock. The transmitter interface replicates every bit of the data, thereby presenting data of regular lengths to the serializer. As a result, the real data rate is reduced. The opposite operation is used by the receiver interface.

The above summary of the invention is not intended to describe each disclosed embodiment of the present invention. The figures and detailed description that follow provide additional exemplary embodiments and aspects of the present invention.

DETAILED DESCRIPTION OF THE INVENTION

The invention is an interface to the SERDES that cuts the lowest operating serial baud rate in at least half without modifying the SERDES design. Without this technique, it is necessary to modify the SERDES so it can operate at lower serial baud rates while still preserving superior performance at the higher speeds. This is a difficult design problem. For example, the SERDES uses PLLs, which are harder to design for reliable operation over larger frequency ranges.

Figure 1:
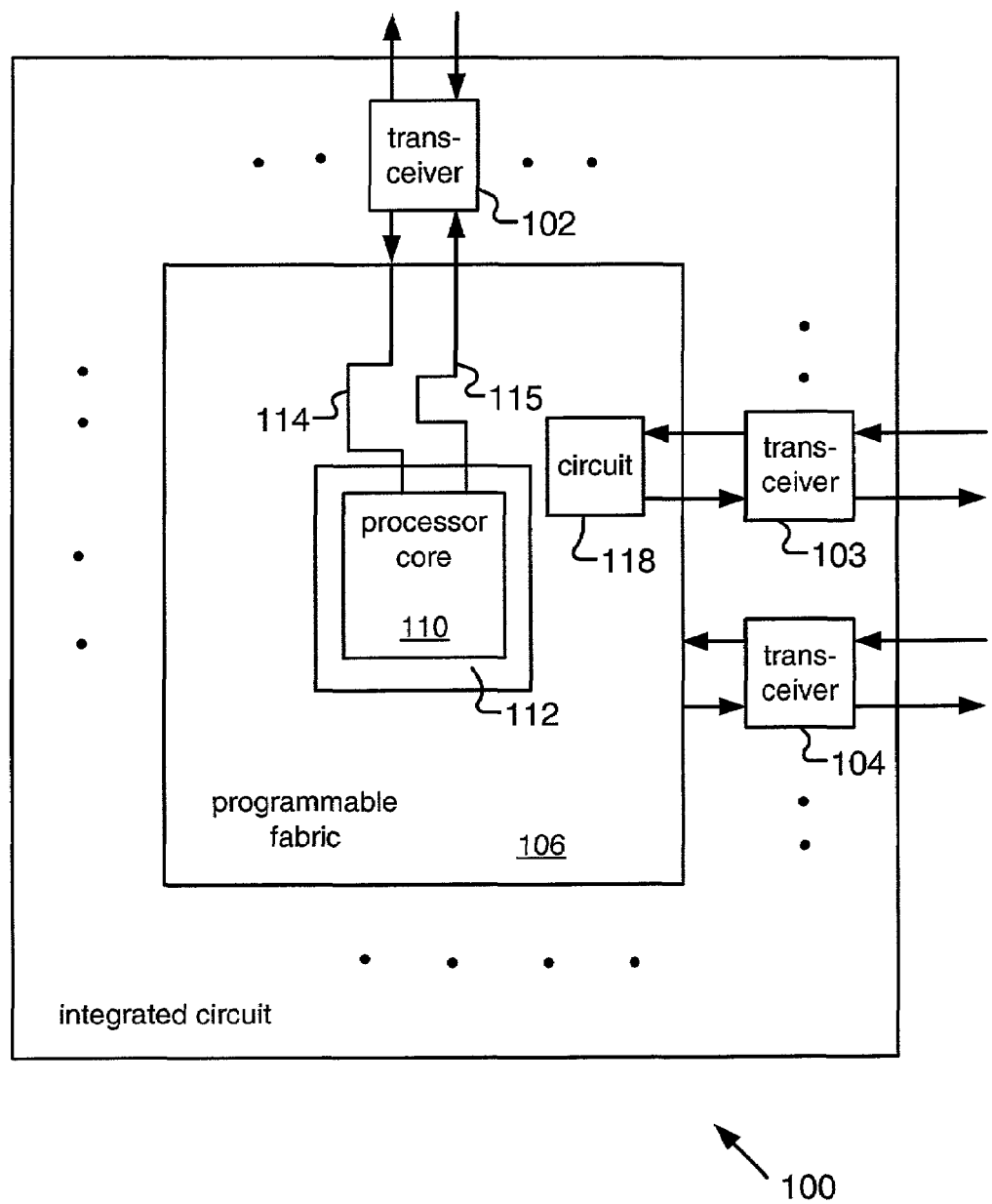
FIG. 1 is a schematic diagram of an integrated circuit containing a plurality of transceivers of the present invention.

A schematic diagram showing an integrated circuit 100 of the present invention is shown in FIG. 1. It contains a plurality of transceivers, such as transceiver 102–104, positioned outside of programmable fabric 106. In one embodiment, programmable fabric 106 comprises field programmable gate array (FPGA) fabric. One or more processor cores, such as processor core 110, can be optionally embedded inside programmable fabric 106. An interface layer 112 is used to facilitate communication between embedded processor core 110 and fabric 106. An example of an interface layer is disclosed in a copending patent application entitled "Programmable Gate Array Having Interconnecting Logic To Support Embedded Fixed Logic Circuitry" (Ser. No. 09/968,446 and filed Sep. 28, 2001). Processor core 110 can be connected to one or more transceivers. In FIG. 1, a pair of routed paths 114–115 are used to schematically show the connection from transceiver 102 to processor core 110 through interface layer 112 and programmable fabric 106. Processor core 110 is preferably designed to process data in high speed. Thus, transceivers 102–104 are preferably high speed transceivers.

Processor core 110 can be one of a variety of signal processing devices, such as a microprocessor, network processor, video processor. Note that more than one processor core can be embedded inside programmable fabric 106.

A user may configures a plurality of circuits in programmable fabric 106. Some of these circuits may communicate with transceivers 102–104. For example, FIG. 1 shows a circuit 118 in programmable fabric 106 communicating with transceiver 103.

Figure 2A:
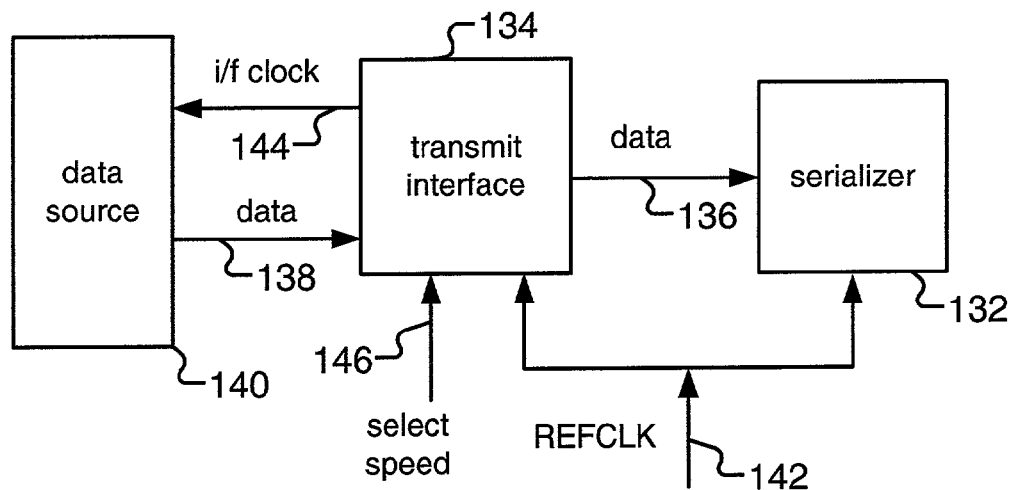
FIG. 2A is a block diagram showing a serializer and a transmitter interface of the present invention.

FIG. 2A is a block diagram showing a serializer 132 and a transmitter interface 134. In FIG. 2A, transmitter interface 134 denotes that portion of the transceiver that presents data on a bus 136 to serializer 132. In one example, the data is 20 bits wide. Transmitter interface 134 accepts data on a bus 138 originated from a data source 140 within the transceiver, a reference clock (shown as REFCLK 142) that is shared with serializer 132, and a signal 146 for selecting the speed of operation of the transceiver. Transmitter interface 134 generates an interface (i/f) clock 144 so that data in data source 140 can be properly stored into transmitter interface 134.

Figure 2B:
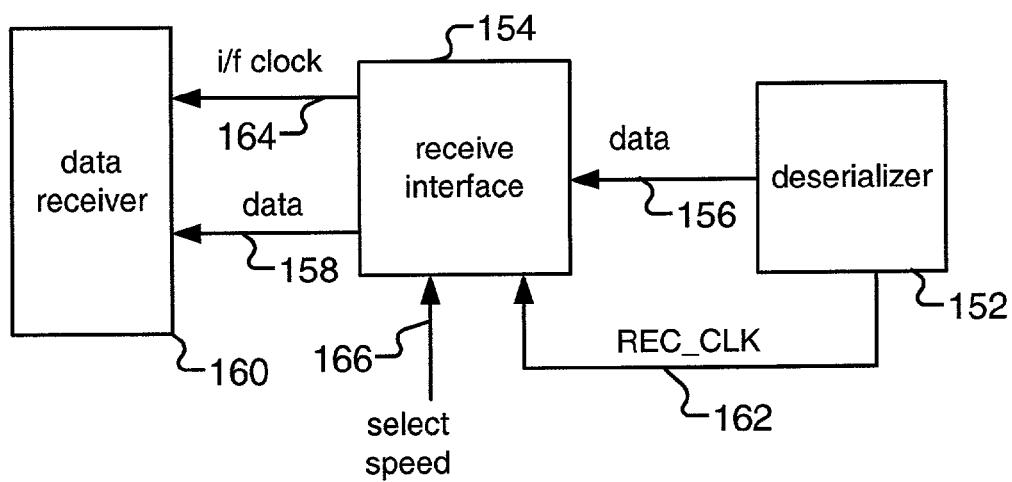
FIG. 2B is a block diagram showing a deserializer and a receiver interface of the present invention.

Similarly, FIG. 2B is a block diagram showing a deserializer 152 and a receiver interface 154. In FIG. 2B, receiver interface 154 denotes that portion of the transceiver that receives data on a bus 156 from deserializer 152. The data is then passed on to a data receiver 160 within the transceiver on a bus 158. Receiver interface 154 accepts a recovered clock (shown as REC_CLK 162) from deserializer 152 and a signal 166 for selecting the speed of operation of the transceiver. Receiver interface 154 also delivers data 158 to data receiver 160 and generates an i/f clock 164 so that data can be properly stored into data receiver 160.

The SERDES consists of the serializer 132 (FIG. 2A) and deserializer 152 (FIG. 2B) combined.

In normal full-speed operation, the serializer uses a reference clock whose frequency is 1/20 of the serial baud rate (for a 20-bit vector), for example, 50 MHz for a serial baud rate of 1 Gbps. In one design, the serializer internally stores the 20 bits to be transmitted on the rising edge of the reference clock. Referring to FIG. 2A, the transmitter interface 134 accepts REFCLK 142 and passes it unmodified to the i/f clock 144 for use by the data source 140. The data source 140 uses the rising edge of the i/f clock 144 to store the data 138 that it presents to the transmitter interface 134. The transmitter interface 134 copies the data 138 unmodified to the data bus 136 connected to the serializer 132. In this usage (full-speed operation), the transmitter circuit behaves as if the transmit interface 134 were not present, with REFCLK 142 directly connected to i/f clock 144, and data 138 directly connected to data 136.

Figure 5A:
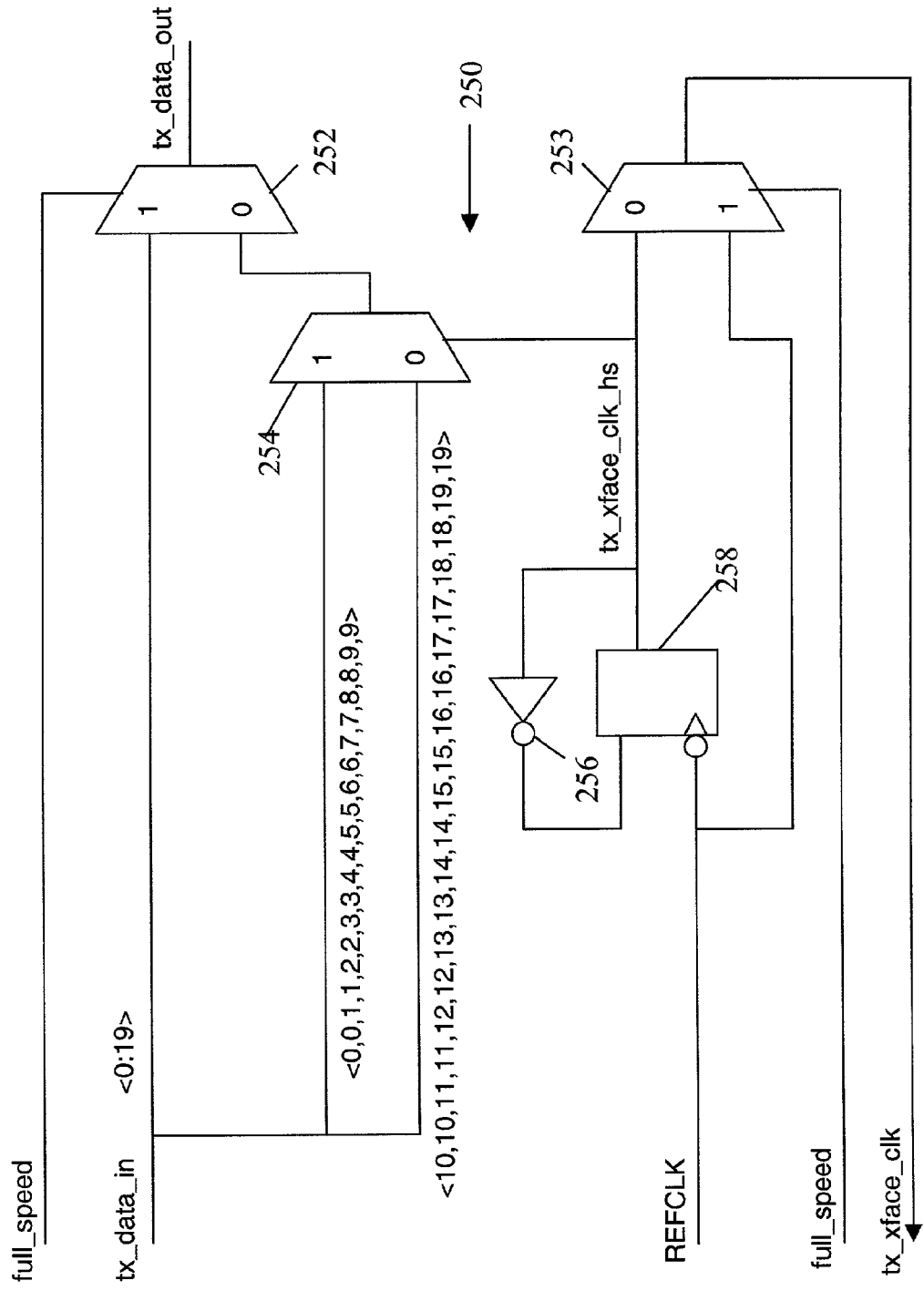
FIG. 5A is a schematic diagram of a portion of a transmitter interface of the present invention.

To reduce the minimum transmission serial baud rate, the transmitter interface also supports an option for half-speed operation. In this mode, the transmitter interface 134 derives from REFCLK 142 a half-speed clock using a negative edge triggered flip-flop, and it presents the half-speed clock on the i/f clock 144 for use by the data source 140. The data source 140 stores a new value on data 138 at each rising edge of i/f clock 144, that is, at every second falling edge of REFCLK 142. For each cycle of REFCLK, the transmitter interface 134 stretches 10 bits of data 138 to 20 bits for presentation on data 136 to the serializer 132. This is done using the half-speed clock as a multiplexer selector input choosing the 10 bits of data 138 to be transmitted. One circuit implementation of this aspect of the invention is shown in FIG. 5A. Each rising edge of REFCLK stores a different set of 10 bits (stretched to 20) into the serializer for transmission.

As an example, consider this sequence of two 20-bit vectors to be transmitted.
00111110101100001100; and
00111101000011111010

On each rising edge of REFCLK, the transmitter presents 10 bits of the above sequence, stretched to 20 bits by replicating each bit.

```
0011111010 --> 00 00 11 11 11 11 00 11 00
1100001100 --> 11 11 00 00 00 00 11 11 00 00
0011110100 --> 00 00 11 11 11 11 00 11 00 00
0011111010 --> 00 00 11 11 11 11 00 11 00
```

Figure 3:
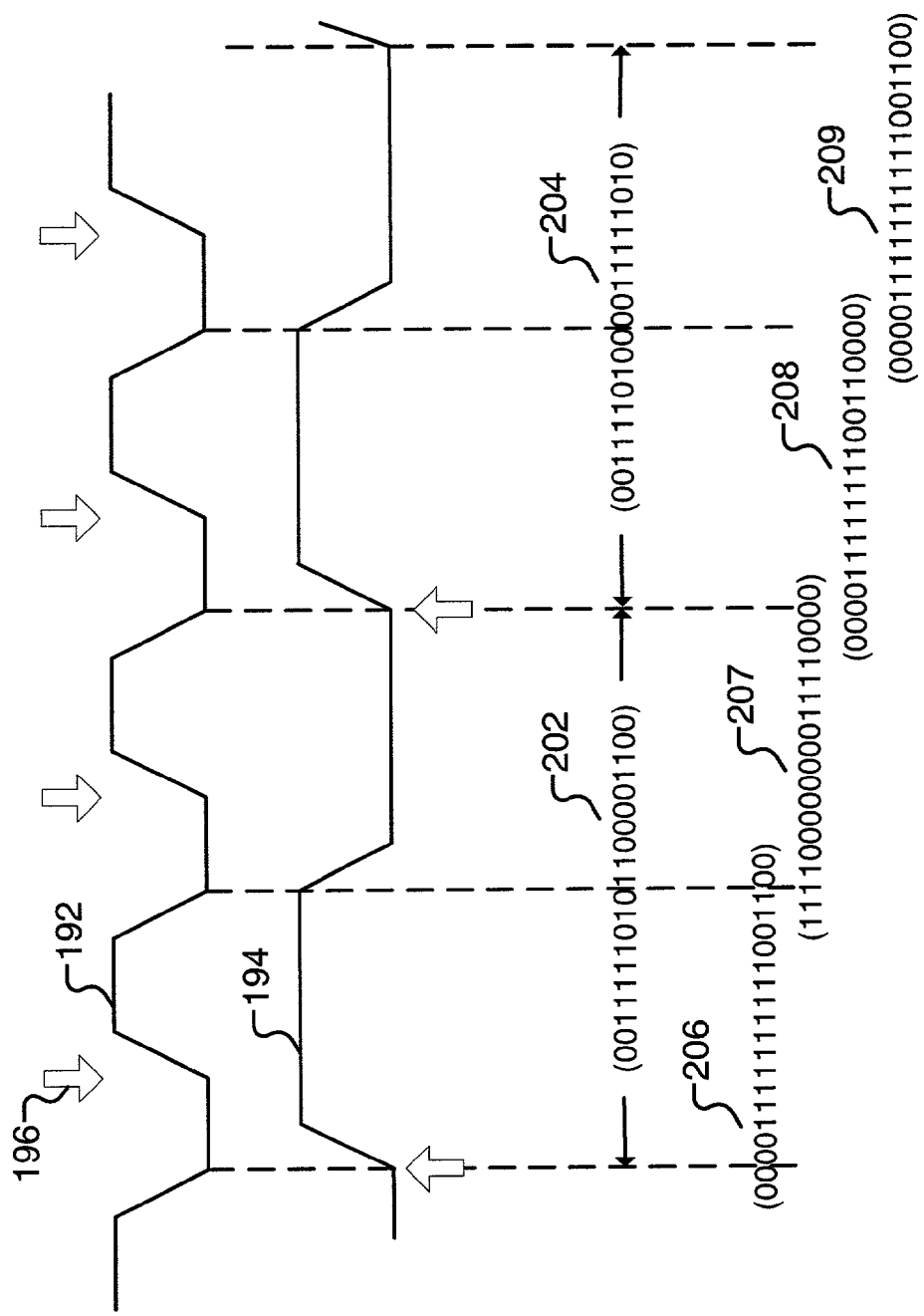
FIG. 3 shows waveforms of the transmitter interface of the present invention when it operates under one half data speed.

FIG. 3 shows the resulting clocking and data timing diagram for half-speed operation of the present invention. It shows a reference clock (REFCLK) 192 that is fed to the serializer. It also shows the i/f clock 194 that is generated by the transmitter interface. It can be seen that the frequency of the interface clock is basically half of REFCLK. Arrows (such as an arrow 196) are used to show the times when data is stored by the data source 140 using i/f clock 194 and by the serializer using reference clock 192. FIG. 3 shows an example of the data vectors 202 and 204 presented on the data connection 138 to the transmitter interface. Each data value 202 and 204 occupies one clock cycle of the i/f clock 194. The corresponding values of data delivered to the serializer are shown as data 206–209. Each data value occupies one clock cycle of REFCLK 192. In this way, the serializer transmits serial data at an effective rate of ten times the REFCLK frequency rather than the normal twenty.

The inverse operation is done on the receiver side. Referring to FIG. 2B, the deserializer 152 presents 20 bits of parallel data 156 plus a recovered clock 162 to the receiver interface 154. In one design, the 20-bit data changes on falling recovered clock. For normal full-speed operation, the receiver interface 154 passes these data and clock unmodified via data 158 and i/f clock 164 to the data receiver 160. The data receiver 160 uses the rising edge of the i/f clock 164 (that is, the edge during which data 158 is stable) to store data 158.

Figure 5B:
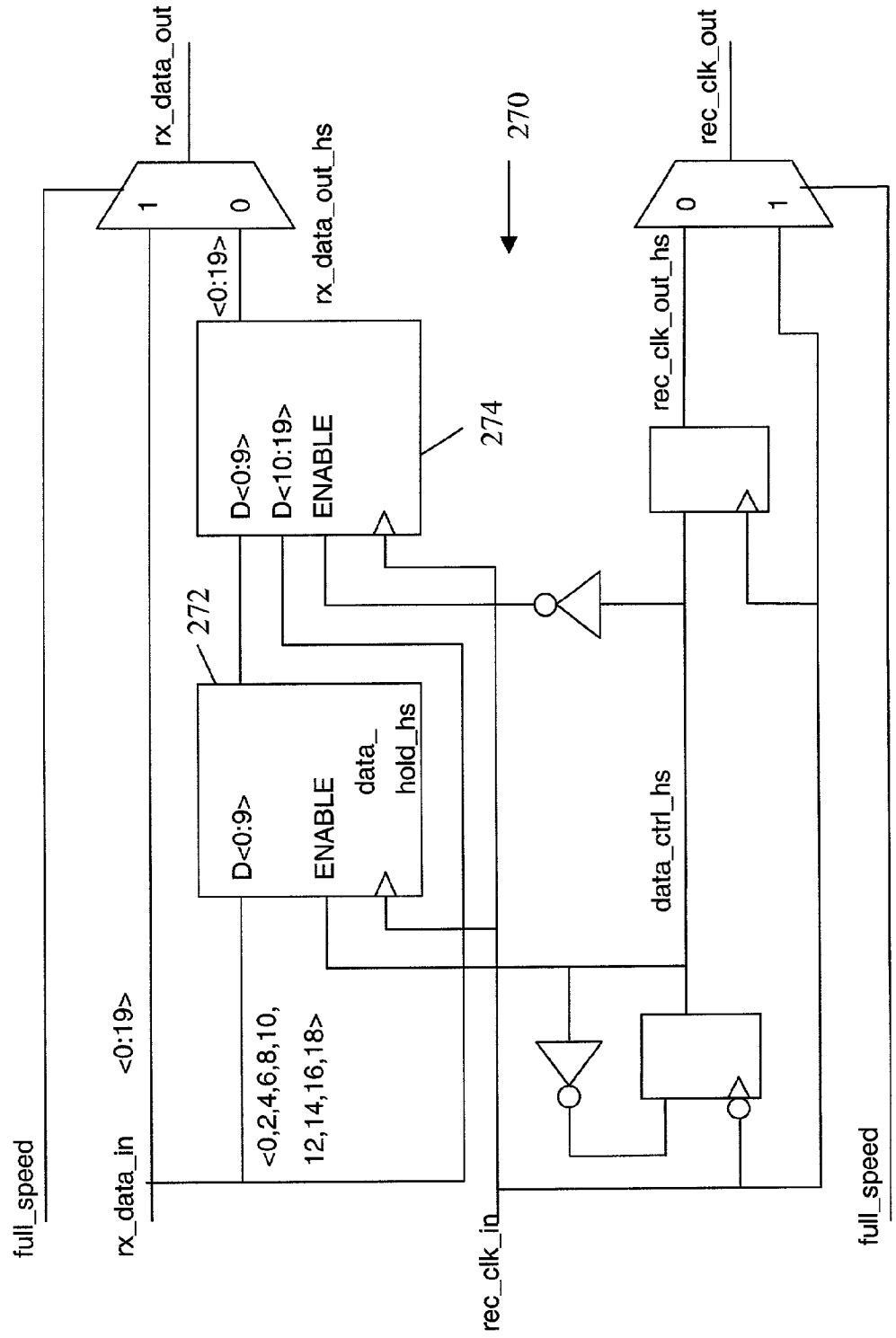
FIG. 5B is a schematic diagram of a portion of a receiver interface of the present invention.

To reduce the minimum receiver serial baud rate, the receiver interface also supports an option for half-speed operation. In this mode, the receiver interface 154 derives from REC_CLK 162 a half-speed clock that changes on rising REC_CLK. The receiver interface presents the half-speed clock on the i/f clock 164 for use by the data receiver. On each rising edge of REC_CLK 162, the receiver interface 154 also internally stores alternating bits of data 156, that is, half the bits (10 bits, assuming data 156 is 20 bits wide). On every second rising edge of REC_CLK 162, corresponding to a falling edge of i/f clock 164, the receiver interface presents on data 158 the 10 bits stored by the preceding rising edge of REC_CLK and the 10 bits stored by the current rising edge of REC_CLK, or 20 bits in all. In this way, the receiver effectively reads 10 bits per REC_CLK cycle, half the normal serial baud rate of the deserializer. One circuit implementation of this aspect of the invention is shown in FIG. 5B.

Figure 4:
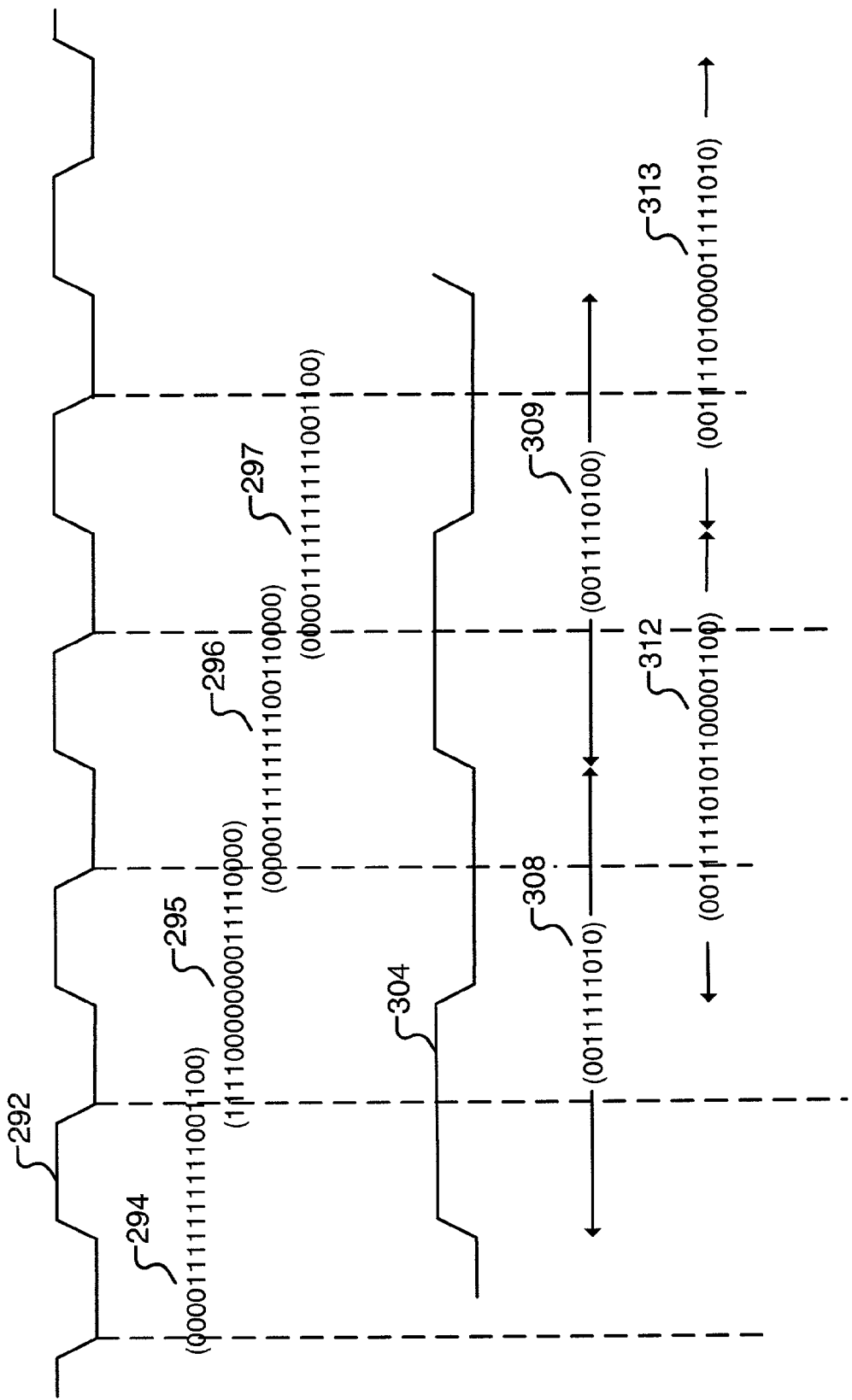
FIG. 4 shows waveforms of the receiver interface of the present invention when it operates under one half data speed.

FIG. 4 shows various clock waveforms and data for half-speed operation of the receiver interface. It shows a recovered clock waveform 292 generated by the deserializer. Four sets of data, 294–297, are generated by the deserializer, one for each recovered clock cycle. FIG. 4 also shows the half-speed recovered clock signal 304 derived from the recovered clock by the receiver interface. Data vectors 308 and 309 show the 10-bit values stored internally by the receiver interface on the rising edges of the recovered clock 292 corresponding to rising half-speed clock 304. Vectors 308 and 309 consist of alternating bits of vectors 294 and 296, respectively. The half-speed data delivered by the receiver interface to the data receiver is shown as data vectors 312 and 313. The receiver interface stores vectors 312 and 313 on the rising edges of the recovered clock 292 corresponding to falling half-speed clock 304. Vector 312 consists of the previously stored vector 308 joined with alternating bits of vector 295; similarly, vector 313 is composed from vectors 309 and 297.

An exemplary circuit 250 that can carry out the necessary clock division and multiplexing in a transmitter interface is shown in FIG. 5A. A similar circuit 270 for the receiver interface is shown in FIG. 5B. Circuit 250 comprises three multiplexers 252–254, a flip flop 258 and an inverter 256. The signals in FIG. 5A have the following significance:

| | |
|---|---|
| full_speed | select speed |
| | (corresponding to signal 146 of FIG. 2A): |
| | = = 1 for full-speed operation; and |
| | = = 0 for half-speed |
| REFCLK | SERDES reference clock |
| | (corresponding to signals 142 of FIG. 2A and 192 of FIG. 3) |
| tx_xface_clk_hs | half-speed clock in transmitter interface |
| tx_xface_clk | transmitter interface clock output |
| | (corresponding to signals 144 of FIG. 2A and 194 of FIG. 3) |
| tx_data_in | transmitter interface data input |
| | (corresponding to signals 133 of FIG. 2A and 202–204 of FIG. 3) |
| tx_data_out | transmitter interface data output |
| | (corresponding to data 136 of FIG. 2A and 206–209 of FIG. 3) |

In this embodiment, the rising edge of output clock tx_xface_clk can be used to store tx_data_in at data source 140 of FIG. 2A.

Circuit 270 comprises two multiplexers, two inverters, two flip-flops, and two registers 272 and 274. Blocks in FIGS. 5A and 5B that have the same shape indicate the same types of components. The signals in FIG. 5B have the following significance:

| | |
|---|---|
| full_speed | select speed signal |
| | (corresponding to signal 166 of FIG. 2B): |
| | = = 1 for full-speed operation; and |
| | = = 0 for half-speed |
| rec_clk_in | recovered clock from deserializer |
| | (corresponding to signals 162 of FIG. 2B and 292 of FIG. 4) |
| rx_data_in | receiver interface data input |
| | (corresponding to data 156 of FIG. 2B and 294–297 of FIG. 4) |
| data_ctrl_hs | receiver interface control |
| rec_clk_out_hs | half-speed recovered clock from receiver interface |
| data_hold_hs | receiver interface internal register, see data 308–309 of FIG. 4 |
| rx_data_out_hs | half-speed data in receiver interface |
| rec_clk_out | receiver interface clock output |
| | (corresponding to signals 164 of FIG. 2B and 304 of FIG. 4) |
| rx_data_out | receiver interface data output |
| | (corresponding to data 158 of FIG. 2B and 312–313 of FIG. 4) |

One of the many parameters that can characterize the operation of a deserializer is the "run length," i.e., the maximum number of consecutive ones or consecutive zeroes that the deserializer can receive in the incoming serial bit stream while still operating correctly. One aspect of the present invention is that when half-speed operation is selected, the run length is half the value of the run length for full-speed operation, e.g., measured in tenths of REFCLK period instead of ½₀'s.

Another aspect of the present invention is that the receiver circuit is designed to strobe the input serial data as closely as possible to the middle of the bit period. For half-speed, the effective bit period is two SERDES bit periods, so the receiver will not be strobing the input serial data at the middle of the effective bit period, but rather near the ¼ or ¾ point. The quality of the lower-speed medium should be able to support this offset in the strobing time.

It should be noted that other circuits for clock division and alignment with respect to data could be designed. This would be the case when the circuit needs to meet other timing requirements.

It should also be noted that the principle of the present invention can be applied to reduce the speed of a SERDES by a factor of four or more.

Those having skill in the relevant arts of the invention will now perceive various modifications and additions which may be made as a result of the disclosure herein. Accordingly, all such modifications and additions are deemed to be within the scope of the invention, which is to be limited only by the appended claims and their equivalents.

The invention claimed is:

1. A transceiver connected to a data source and a data receiver, comprising:
    an input port for accepting a control signal having a first and a second state;
    a serializer designed to operate at a first data rate; and
    a first interface that receives a first set of data from the data source at a second data rate and delivers a second set of data to the serializer at the first data rate, the second data rate being lower than the first data rate when the control signal is at the first state and the second rate being same as the first data rate when the control signal is at the second state.

2. The transceiver of claim 1 wherein the serializer is controlled by a reference clock signal, and wherein the first interface further comprises a circuit for generating a first clock signal based on the reference clock signal, the first clock signal being used by the data source to deliver the first set of data to the first interface, the first clock signal having a lower frequency than the reference clock signal when the control signal is at the first state.

3. The transceiver of claim 2 wherein the first clock signal has a frequency that is substantially equal to half of the reference clock.

4. The transceiver of claim 2 wherein the first interface further inserts additional bits in the first set of data to generate the second set of data.

5. The transceiver of claim 4 wherein the first interface replicates every bit in the first set of data to generate the second set of data.

6. The transceiver of claim 1 further comprising:
    a deserializer designed to operate at the first data rate; and
    a second interface that receives a third set of data from the deserializer at the first data rate and delivers a fourth set of data to the data receiver at the second data rate.

7. The transceiver of claim 6 wherein the deserializer recovers a clock signal, and wherein the second interface further comprises a circuit that generates a second clock signal based on the recovered clock signal, the second clock signal being used by the data receiver to receive the fourth set of data.

8. The transceiver of claim 7 wherein the second clock signal has a frequency that is lower than that of the recovered clock signal when the control signal is at the first state.

9. The transceiver of claim 8 wherein the second clock signal has a frequency that is substantially equal to half of the recovered clock signal.

10. The transceiver of claim 6 wherein the second interface further removes bits in the third set of data to generate the fourth set of data when the control signal is at the first state.

11. The transceiver of claim 10 wherein the second interface removes every alternate bit in the third set of data to generate the fourth set of data.

* * * * *